(12) United States Patent
Sharma

(10) Patent No.: US 8,052,174 B2
(45) Date of Patent: Nov. 8, 2011

(54) PIPE JOINT DESIGN

(75) Inventor: Rajeev Sharma, Troy, MI (US)

(73) Assignee: DENSO International America, Inc., Southfield, MI (US)

( * ) Notice: Subject to any disclaimer, the term of this patent is extended or adjusted under 35 U.S.C. 154(b) by 180 days.

(21) Appl. No.: 12/210,422

(22) Filed: Sep. 15, 2008

(65) Prior Publication Data

US 2010/0066077 A1    Mar. 18, 2010

(51) Int. Cl.
*F16L 39/00* (2006.01)
(52) U.S. Cl. .................... 285/124.1; 285/370
(58) Field of Classification Search .......... 285/370, 285/349, 124.1, 124.2, 124.3, 206, 124.4, 285/124.5, 351
See application file for complete search history.

(56) References Cited

U.S. PATENT DOCUMENTS

| | | | |
|---|---|---|---|
| 874,390 A * | 12/1907 | Carel ............................ 285/39 |
| 1,188,485 A | 6/1916 | Pruyn |
| 2,475,468 A * | 7/1949 | Andrews ................. 285/124.3 |
| 3,221,746 A | 12/1965 | Noble |
| 3,325,190 A * | 6/1967 | Eckert et al. ............... 285/370 |
| 3,508,766 A | 4/1970 | Kessler et al. |
| 3,930,674 A * | 1/1976 | Jonsson .................... 285/124.5 |
| 4,088,414 A | 5/1978 | Fallein |
| 4,209,179 A | 6/1980 | Tolliver |
| 4,303,103 A | 12/1981 | Marks et al. |
| 4,333,662 A | 6/1982 | Jones |
| 4,685,704 A | 8/1987 | Kolar |
| 4,913,465 A | 4/1990 | Abbema et al. |
| 5,048,602 A * | 9/1991 | Motohashi et al. .......... 165/173 |
| 5,224,798 A | 7/1993 | Thomas |
| 5,282,652 A | 2/1994 | Werner |
| 5,316,352 A | 5/1994 | Smith |
| 5,346,261 A | 9/1994 | Abbema |
| 5,480,196 A | 1/1996 | Adams, Jr. |
| 5,547,228 A | 8/1996 | Abbema et al. |
| 5,566,984 A | 10/1996 | Abbema et al. |
| 5,944,319 A | 8/1999 | Kohlman |
| 5,984,370 A | 11/1999 | Lewis |
| 6,106,030 A * | 8/2000 | Nader et al. |
| 6,126,206 A | 10/2000 | Topf, Jr. |
| 6,179,349 B1 * | 1/2001 | Guzzoni ...................... 285/370 |
| 6,375,233 B1 | 4/2002 | Friedmann et al. |
| 6,443,223 B2 * | 9/2002 | Ichiyanagi |
| 6,561,521 B2 * | 5/2003 | Janoff et al. .................. 277/603 |
| 6,733,044 B2 * | 5/2004 | Huang ...................... 285/124.5 |
| 6,769,721 B2 | 8/2004 | Guest |
| 7,104,574 B2 * | 9/2006 | Dukes et al. ................ 285/370 |
| 7,178,556 B2 * | 2/2007 | Reid et al. ................. 285/124.5 |

(Continued)

*Primary Examiner* — Aaron Dunwoody
(74) *Attorney, Agent, or Firm* — Harness, Dickey & Pierce, PLC

(57) ABSTRACT

A connection joint brazed to a heat exchanger may employ a first block and a second block. The first block may have two fluid passages that align with two fluid passages of the second block. A first male insert may reside within a first fluid passage of each of the first block and the second block and a second male insert may reside within a second fluid passage of each block. Each of the male inserts may employ a first seal and a second seal with a raised boss region midway between the seals. The raised boss portion lies at the mated flats of the juncture of the first and second blocks, which are chamfered to permit part of the boss to locate in each of the chamfers. The seals may be o-rings, or they may be molded onto an insert base using an over molding or double shot manufacturing process.

8 Claims, 4 Drawing Sheets

U.S. PATENT DOCUMENTS 7,284,774 B2    10/2007  Bauer et al.
D623,277 S  *   9/2010   Guzzoni et al. .............. D23/262
2006/0006642 A1 *  1/2006  Getto et al. ................... 285/189

* cited by examiner

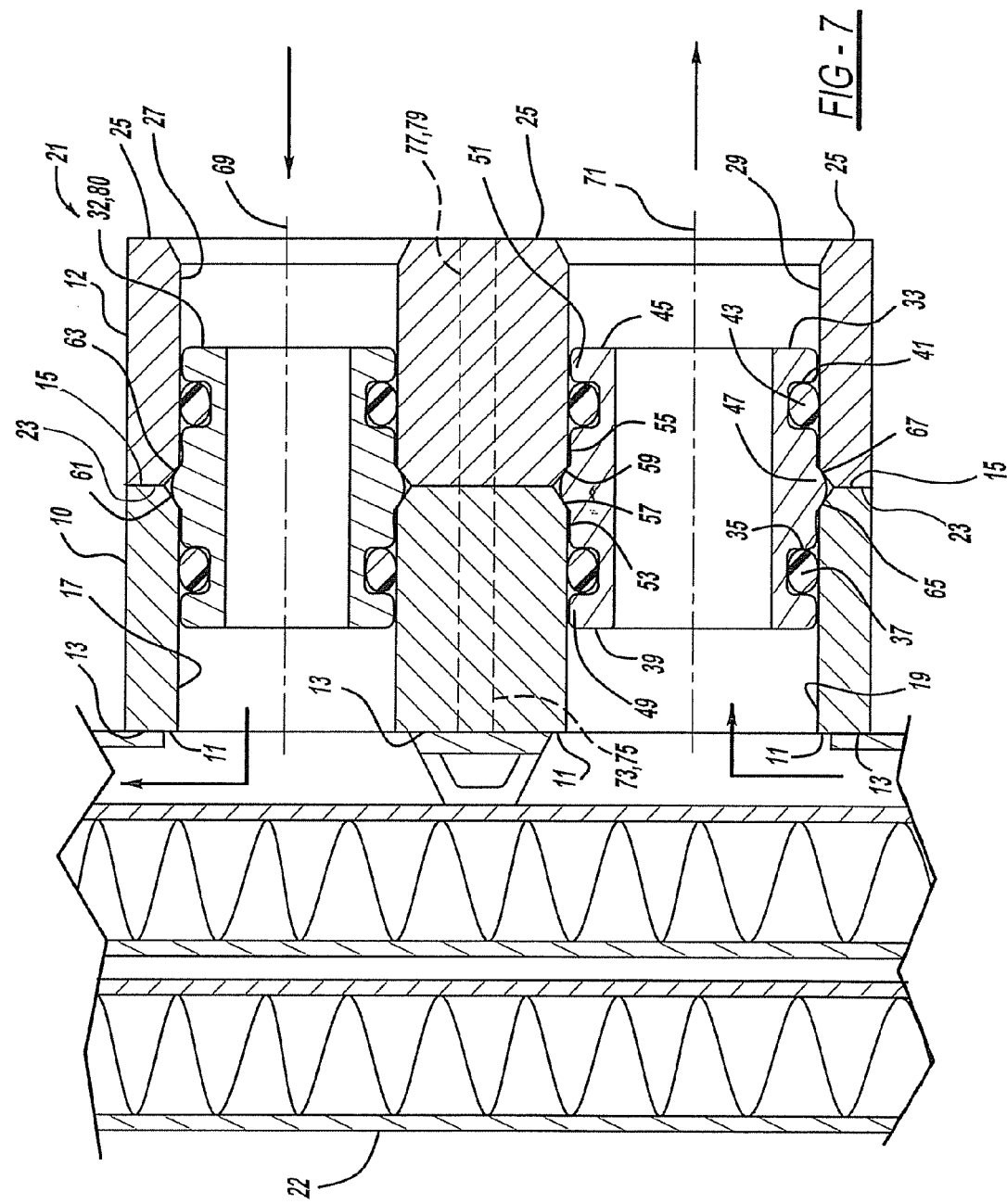

PIPE JOINT DESIGN

FIELD

The present disclosure relates to a pipe joint design for connecting parts for fluid transfer.

BACKGROUND

This section provides background information related to the present disclosure which is not necessarily prior art. Heat exchangers, such as an evaporator for a vehicle air conditioner, typically have a block that serves as the inlet and outlet point for fluid to flow into and from a heat exchanger. As depicted in FIG. 1, the block 2 is a one-piece part that is machined from one solid piece of material, such as aluminum. While such one piece blocks have generally been satisfactory for their given purpose, they are not without their share of limitations. One limitation of current blocks is the cost of machining the part from a large piece of aluminum stock. Another limitation of current blocks is the time and machining cost of making the block. Because the inlet 4 and outlet 6 of the block extend from the base 8 of the block, and the entire block is one piece, machining the inlet 4 and outlet 6 involves intricate time consuming steps and consumes and expends expensive machining tooling. Additionally, because the inlet 4 and outlet 6 are permanently part of the base 8 and form the block 2, the overall evaporator package is larger than it might otherwise be, and because of such size is larger and may be more expensive to ship. Finally, the permanent, protruding inlet and outlets are a point of breakage or damage during shipping, such as to a vehicle assembly plant, and installation, such as into a vehicle.

What is needed then is a device that does not suffer from the above disadvantages. This will provide a non-one piece device whose base is manufactured from a smaller overall piece of material, does not require extensive, intricate machining steps, offers light-weight pieces, and provides the option of a smaller overall shipping package.

SUMMARY

This section provides a general summary of the disclosure and is not a comprehensive disclosure of its full scope or all of its features. A connection joint for a heat exchanger may employ a first block defining a flat first side and a flat second side that are parallel to each other. The joint may also employ a second, nearly identical block. Each block may have a first fluid passage and a second fluid passage passing through the first and second flat sides and the first and second fluid passages may be parallel to each other. The second block may define a flat third side and a flat fourth side. The third and fourth flat sides may be parallel to each other with a third fluid passage and a fourth fluid passage passing through the third and fourth flat sides with the third and fourth fluid passages being parallel to each other. A first male insert may reside within the first fluid passage of the first block and the third fluid passage of the second block to hold the two blocks against each other. The first male insert may further employ a first groove containing a first seal around an outside diameter proximate a first end and a second groove containing a second seal around an outside diameter proximate a second end. A second male insert may reside within the second fluid passage of the first block and the fourth fluid passage of the second block. The second male insert may have a third end and a fourth end. The second male insert may further employ a third groove containing a third seal around an outside diameter and proximate the third end, and a fourth groove containing a fourth seal around an outside diameter and proximate the fourth end, such that the second side of the first block and the third side of the second block may be held flat against each other by the first male insert and the second male insert.

The first male insert may further employ a central boss, the central boss having an outside diameter larger than either the first seal of the first groove or the second seal of the second groove. The first male insert may further employ a first leading surface and a second leading surface, the first and second leading surfaces may be farther from the central boss than the first seal of the first groove or the second seal of the second groove. Furthermore, the first male insert may further employ a first trailing surface and a second trailing surface, the first and second trailing surfaces may be closer to the central boss than the seal of the first groove or the seal of the second groove. Moreover, the first male insert may further employ a first inclined surface leading from the first trailing surface to the outside diameter of the central boss.

The connection joint may further employ a first chamfer at an intersection of the first fluid passage of the first block and the flat second side, such that the first inclined surface of the first male insert abuts against the first chamfer. A second inclined surface may lead from the second trailing surface to the outside diameter of the central boss. The second block may further employ a second chamfer at an intersection of the third fluid passage of the second block and the flat third side, such that the second inclined surface of the first male insert abuts against the second chamfer.

A centerline of the first fluid passage of the first block may align with a centerline of the third fluid passage of the second block. A centerline of the second fluid passage of the first block may align with a centerline of the fourth fluid passage of the second block. The flat first side of the first block may be connected to an evaporator, such as by brazing, welding, soldering, or use of fasteners, such as screws.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals may indicate corresponding parts throughout the several views of the drawings.

FIG. 7 is a side view of an assembled female block to female block connection that is attached to a heat exchanger.

DETAILED DESCRIPTION

Figure 2:
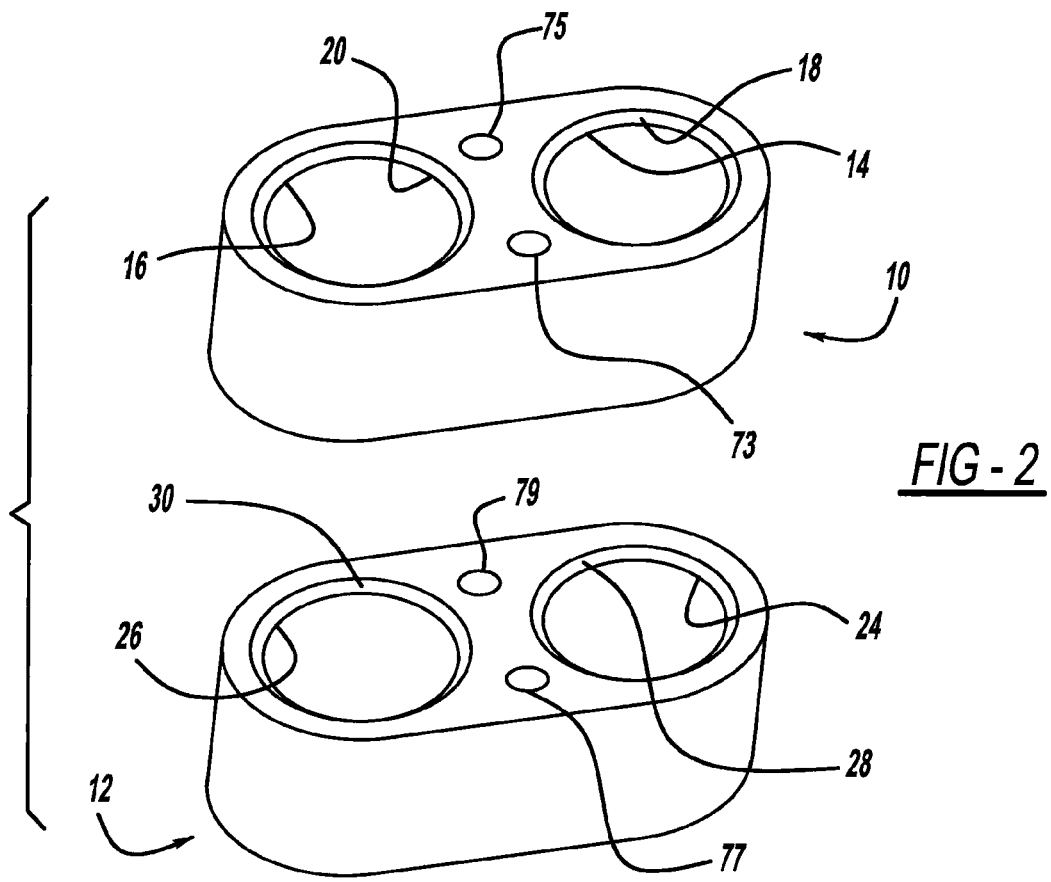
FIG. 2 is a perspective view of female blocks for an inlet and outlet of a heat exchanger according to the present teachings.

Example embodiments will now be described more fully with reference to accompanying FIGS. 2-7. FIG. 2 depicts a first female block 10 and a second female block 12. The first female block 10 has a first hole 14 and a second hole 16. Additionally, the first hole 14 has a first chamfer 18 while the second hole 16 has a second chamfer 20. The first hole 14, also an inlet hole for an air conditioning evaporator 22 (FIG. 7), has a first chamfer 14, while the second hole 16, also an outlet hole from the air conditioning evaporator 22, has a second chamfer 20. Similarly, and continuing with FIG. 2, the second female block 12 has a third hole 24 and a fourth hole 26. The third hole 24, also part of the inlet hole for an air conditioning evaporator 22, has a third chamfer 28, while the fourth hole 26 has a fourth chamfer 30.

Figure 3:
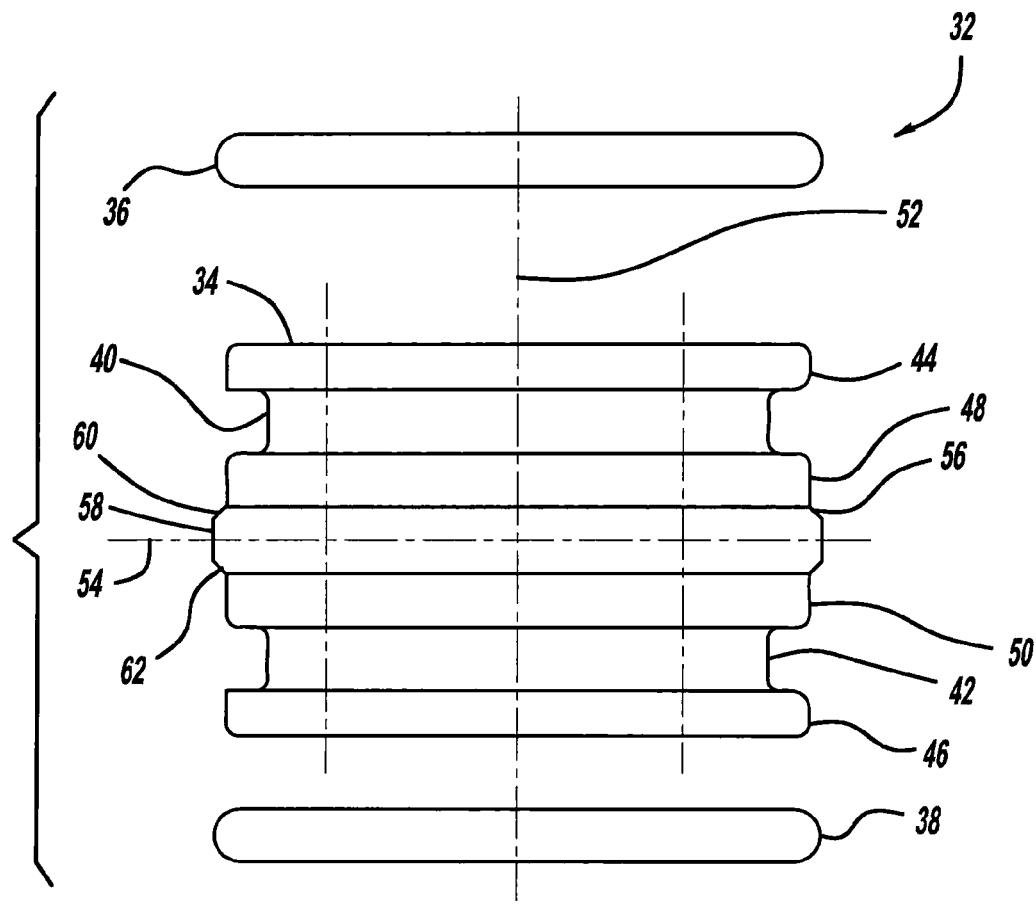
FIG. 3 is a perspective view of a male-male seal with accompanying o-rings, in accordance with a first embodiment of the present teachings.
Figure 5:
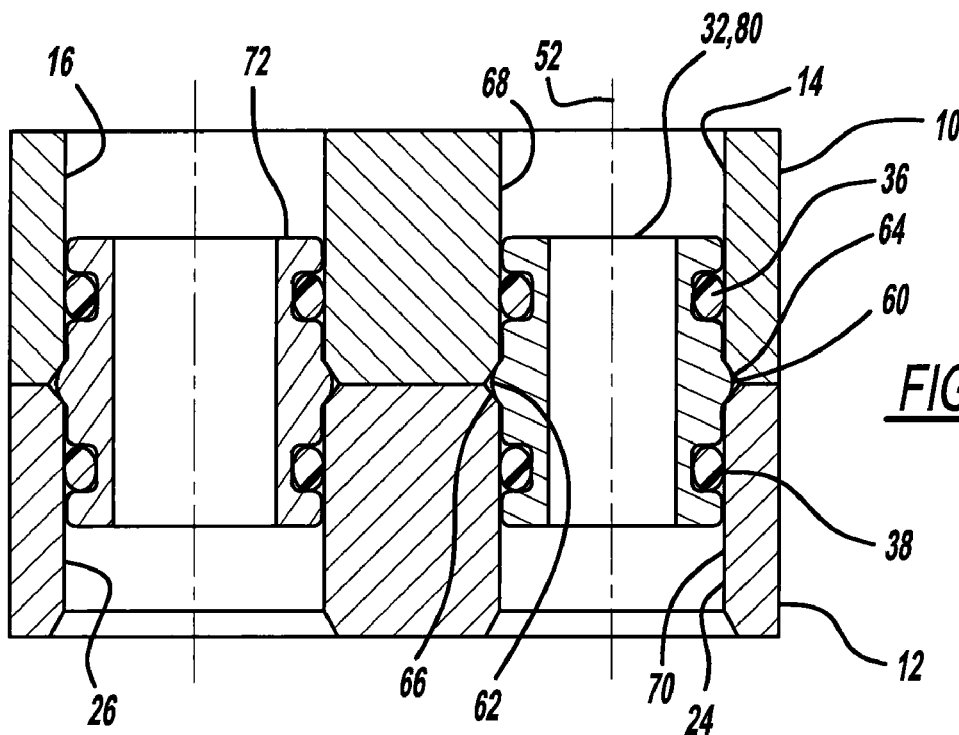
FIG. 5 is a side view of an assembled female block to female block connection using seals of the present teachings.

Continuing with reference to FIG. 2, the first female block 10 and second female block 12 may be joined together using an insert seal 32, which is depicted in FIG. 3 and FIG. 5. More specifically, the insert seal 32 may have a base portion 34 over which a first o-ring 36 and a second o-ring 38 may be installed. With more specific reference to FIG. 3, the base portion 34 has a first groove 40, within which the first o-ring 36 may be situated, and a second groove 42, within which the second o-ring 38 may be situated. Continuing, the base portion 34 has a first leader portion 44 and a second leader portion 46, each leader portion 44, 46 being at an end of the insert seal 32 so that the insert seal 32 may be aligned with the holes 14, 16 of the first female block 10 and holes 24, 26 in the second female block 12. Continuing, the insert seal 32 may have a first trailing portion 48 and a second trailing portion 50 located on an opposite side of a respective o-ring 36, 38 from a respective leader portion 44, 46. To facilitate alignment and insertion into a hole 14, 16 of the first female block 10, as an example, the leading portion 44 and trailing portion 48 have equal diameters. Similarly, the leading portion 46 and trailing portion 50 may also have equal diameters. As an example, the insert seal 32 may be inserted into the first hole 14 of the first female block 10 from either end of the insert seal 32. That is, either leading portion 44 or leading portion 46 may be inserted into the first hole 14. The insert seal 32 is symmetrical about a central vertical axis 52 and a central horizontal axis 54.

The insert seal 32 of FIG. 3 also employs a central boss 56 that is bifurcated by the central horizontal axis 54 and is symmetrical about the central vertical axis 52. More specifically, the central boss 56 has a land 58, which has a larger diameter than either of the leading portions 44, 46 or trailing portions 48, 50, and is used to stop the insert seal 32 from being inserted any farther into either of the first female block 10 or second female block 12, and more specifically, from being inserted into any of the holes 14, 16, 24, 28 in the blocks 10, 12. In addition to the circular land 58, the central boss 56 has a first inclined surface 60 and a second inclined surface 62, one on each side of the land 58. The first and second inclined surfaces 60, 62 blend or connect the land 58 with a trailing portion 48, 50.

The inclined surfaces 60, 62 also serve another purpose, which is to contact an inclined surface on the female blocks 10, 12. As an example, and with reference to FIG. 5, the inclined surface 60 of the insert seal 32 contacts the inclined surface 64 of the female block 10, and because of such contact of inclined surfaces 60, 64, the insert seal 32 reaches its farthest insertion point into the female block 10. With continued reference to FIG. 5, when the insert seal 32 is inserted into the female block 10, the female block 12 may then be inserted over the insert seal 32. Upon the female block 12 being inserted over the insert seal 32, the second inclined surface 62 of the insert seal 32 will contact or rest against the inclined surface 66 of the second female block 12, as depicted. When the insert seal 32 is fully inserted within the first female block 10 and second female block 12, the first o-ring 36 compresses and seals against the inside diameter 68 of the hole 14 of the first female block 10 and the second o-ring 38 compresses and seals against the inside diameter 70 of the hole 24 of the second female block 12. The installation of the insert seal 32 described above has been in conjunction with the smaller hole 14 of the first female block 10; however, the same procedure may be used for the larger hole 16 of the first female block 10. Similarly the same procedure may be applied to the larger hole 26 of the second female block 12 as is applied to the smaller hole 24 of the second female block 12. When insertions are complete, as depicted in FIG. 5, the insert seal 32 may reside within the hole 14 and hole 24, and a second insert seal 72 may reside within the hole 16 of the first female block 10 and the hole 26 of the second female block 12.

Another feature of the central boss 56 of FIG. 3 is that it acts as a locator or type of stop for an installer. More specifically, as the first insert seal 32 is inserted into the first female block 10, and the central boss 56, and more specifically, the inclined surface 60 makes contact with the inclined surface 64 of the first female block 10, an installer instantly knows that a complete installation has been made because the first insert seal 32 can not be pressed any further. Removal and replacement of the first insert seal 32 may be made with a pair of pliers, for example.

Although the first insert seal 32 has been described above using plastic as a manufacturing material; however, other materials and methods may be used. For instance, nylon may be used to manufacture, such as with injection molding, the first insert seal 32. Additionally, aluminum could be used in a pipe end forming operation, sheet metal stamping and deep drawing using spring steel may be used to manufacture the first insert seal 32. Finally, although perhaps more time consuming from a manufacturing perspective, the first insert seal 32 could be machined from plastic or aluminum, such as from bar stock. Although the o-rings 36, 38 described above have been presented as separate parts that may be installed over the first insert seal 32, the o-rings 36, 38 may be over molded onto the first insert seal 32.

Figure 1:
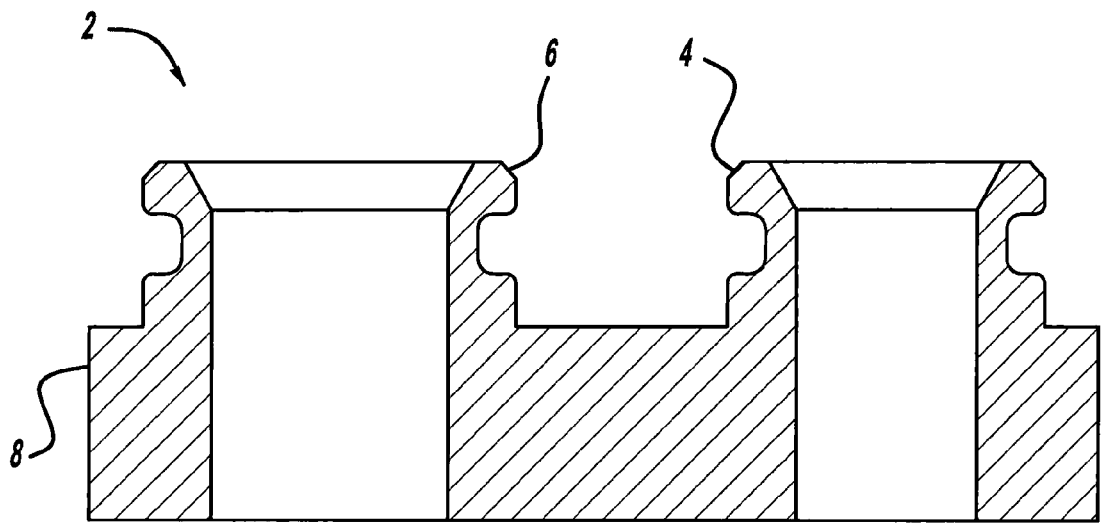
FIG. 1 is a side view of a one-piece male block for an inlet and outlet of a heat exchanger according to the prior art.

There are multiple advantages to the use of the first female block 10, the first insert seal 32, and the second insert seal 72, as compared to the block 2 of FIG. 1. One advantage is that a smaller machined aluminum component is required. Regarding the device depicted in FIG. 1, the entire block 2, including the protruding inlet 4 and outlet 6 are machined from aluminum. However, with the teachings of the present disclosure in FIG. 5, only the first female block 10 is machined from aluminum. The insert seal 32 and insert seal 72 may be manufactured from plastic and inserted into the first female block 10. Thus, raw aluminum material and associated machining is conserved and less expensive plastic for the first insert seal 32 and second insert seal 72 is utilized. Another advantage is that because the size of the first female block 10, in accordance with the present teachings, is smaller than the overall size of the block 2 depicted in FIG. 1, the packaging of the combination of a heat exchanger, such as an evaporator 22, and the first female block 10, which is brazed to the evaporator 22, is smaller than if the block 2 of FIG. 1 is brazed to the evaporator 22. The first insert seal 32 and the second insert seal 72 may be installed or pressed into the first female block 10 at any time, such as after arrival of the evaporator 22 at a vehicle assembly factory. Such is not possible with the block 2 depicted in FIG. 1 because the entire block 2 is one piece and becomes part of the heat exchanger upon its brazing to the heat exchanger. Upon brazing the block 2 to a heat exchanger, the inlet 4 and outlet 6 protrude and become susceptible to breaking during shipping to further assembly operations.

Another advantage is that because the first insert seal 32 and second insert seal 72 are separate physical pieces and may be manufactured from plastic, the overall weight of the combination of the first female block 10, the first insert seal 32, and second insert seal 72 is less than an entire block 2, as depicted in FIG. 1, that is made from aluminum. Another advantage is that if either of the first insert seal 32 or second insert seal 72 becomes damaged, replacement is quick and simple and does not require replacement of an aluminum part that is brazed to the evaporator 2.

Figure 4:
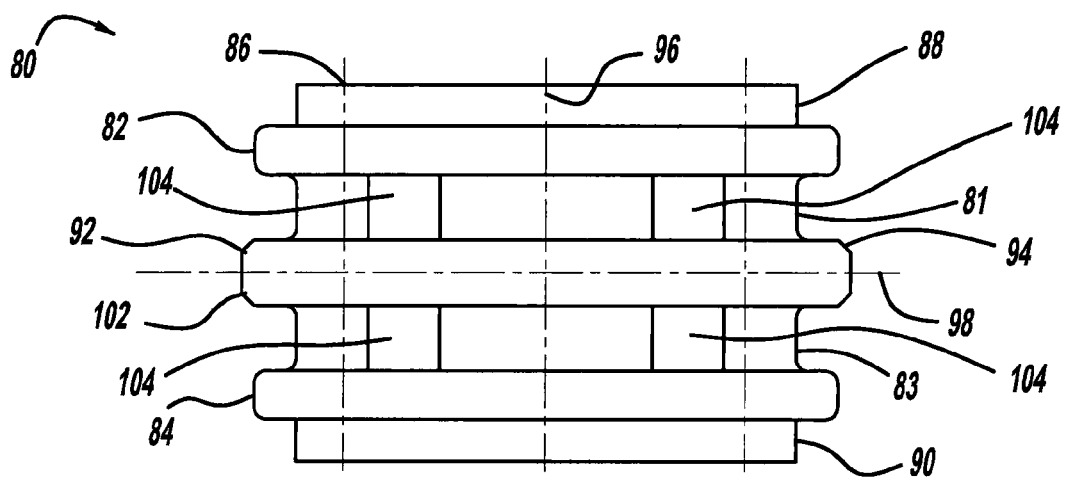
FIG. 4 is a perspective view of a male-male seal with accompanying seals, in accordance with a second embodiment of the present teachings.

Turning now to FIG. 4, another embodiment of the teachings is depicted. More specifically, an insert seal 80 is depicted in which a first seal 82 and a second seal 84 may be manufactured onto an insert seal base 86 in either an insert molding process or a dual shot molding process. The insert seal base 86, also known as a holder, may be manufactured from a material such as aluminum, plastic (e.g. nylon), or spring steel as described above. The first seal 82 and second seal 84 may be manufactured from EPDM, which is an ethylene propylene diene M-class rubber. Similar to the embodiment depicted in FIG. 3, the embodiment depicted in FIG. 4 is pressed into the first female block 10 beginning with the leading portion 88 and as the first seal 82 makes contact with the inside diameter 68 of the first hole 14, the insert seal 80 aligns with the first hole 14 until the central boss 92 contacts the inclined surface 64 of the first female block 10. More specifically, the insert seal 80 protrudes into the first hole 14 until the first inclined surface 94 contacts the inclined surface 64 of the first female block 10. Because the insert seal 80 is symmetric about a central vertical axis 96 and a central horizontal axis 98, the central boss 92 has a second inclined surface 100 that is on an opposite side of a boss land 102.

Continuing with FIG. 4, to assist the first seal 82 in maintaining its shape during insertion of the insert seal 80 and from moving in any fashion from the position to perform its intended function of sealing, the first seal 82 is equipped with one or more support braces 104. The support brace 104 helps to maintain the location of the first seal 82 relative to the central boss 92. More specifically, the support brace 104 provides a fixed distance between the central boss 92 and the first seal 82. The distance between the first seal 82 and the central boss 92 may vary depending upon the overall size of the insert seal 80, such as the overall longitudinal length of the insert seal 80 and the overall outside diameter of the central boss 92.

Similar to the embodiment of the insert seal 32 depicted in FIG. 3, the insert seal 80 depicted in FIG. 4 also employs a central boss 92 with an overall or outside diameter that is larger than the outside diameters of the first seal 82 and the second seal 84, which themselves may have equal outside diameters. Similar to the first seal 82, the second seal 84 may be equipped with support braces 104 to maintain a prescribed distance between the central boss 92 and the second seal 84. The support braces 104 also prevent the first seal 82 and second seal 84 from moving or compressing longitudinally along the length of the insert seal 80 during movement of the evaporator to which the first female block 10 is installed. Although not specifically depicted, the first seal 82 and second seal 84 protrude into the outside diameter of the leading portion 88 and leading portion 90, respectively, and are imbedded in the leading portions 88, 90, respectively. That is, there are grooves, similar to the grooves 40, 42 of the insert seal 32 of FIG. 3, into which the first seal 82 and second seal 84 of the insert seal 80 of FIG. 4 may be situated. When the insert seal 80 of FIG. 4 is inserted, for example, into the first hole 14 of FIG. 5, the cross-section is the same as for the insert seal 32 when it is installed into the first hole 14 of FIG. 5.

Figure 6:
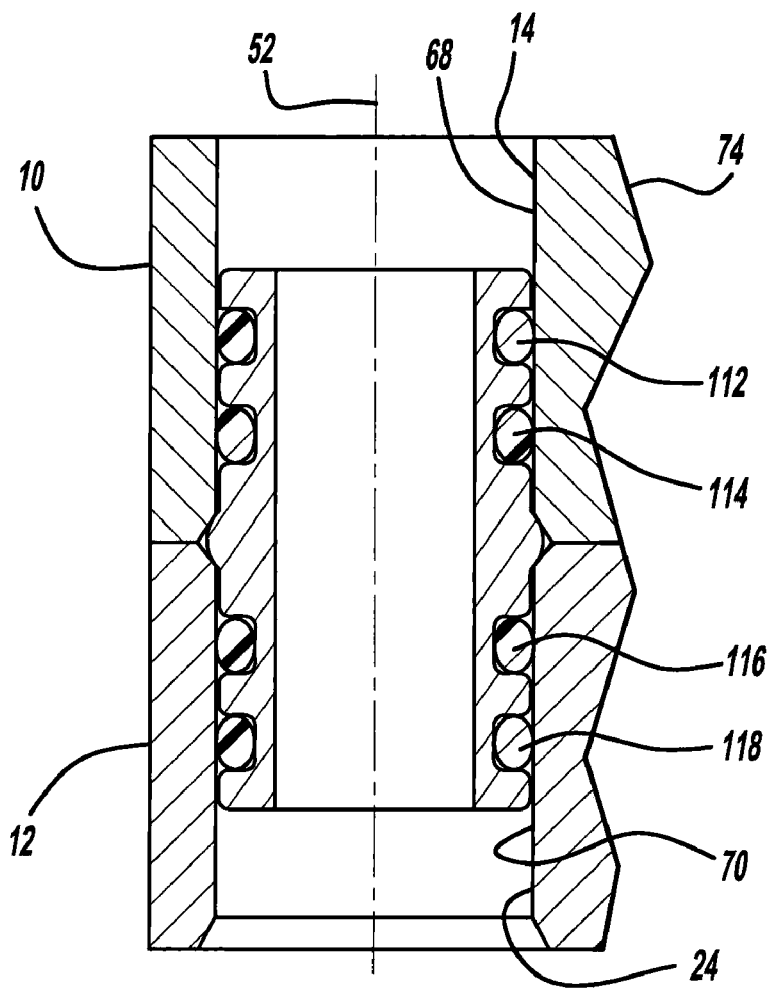
FIG. 6 is a side view of an assembled female block to female block connection using seals of the present teachings.

Turning to FIG. 6, a cross-sectional view of another embodiment of the present teachings is depicted. More specifically, the embodiment of FIG. 6 depicts an insert seal 110 with a first seal 112, a second seal 114, a third seal 116 and a fourth seal 118. The advantage of using a first seal 112 and a second seal 114 to seal against the inside diameter 68 of the first hole 14 of the first female block 10 is that liquid will be better sealed from leaking to the outside of the first female block 10 through the first hole 14. Similarly, the third seal 116 and fourth seal 118 seal against the inside diameter 70 of the third hole 24. The cross-sectional view depicted in FIG. 6 may represents the type of insert seal 32 depicted in FIG. 3 or the type of insert seal 80 depicted in FIG. 4, with the addition of one additional seal within each of the first female block 10 and second female block 12. FIG. 6 has a mirror image about broken line 74 that is not depicted.

FIG. 7 depicts the first female block 10 brazed to an evaporator 22. Additionally, the first female block 10 is joined or connected to the second female block 12 using the first insert seal 32 and the second insert seal 72, as explained above. Although not depicted, the second female block 12 may be connected to another structure, such as an inlet tube for a refrigerant liquid and an outlet tube for a refrigerant gas.

In another description of the teachings, a connection joint 21 (FIG. 7) for a heat exchanger 22 may employ a first block 10 having a non-protruding flat first side 11 that may be connected (e.g. brazed) to the heat exchanger 22. A non-protruding flat side is a surface that has nothing protruding from its surface, although a hole may be present in the flat surface. Brazing may be performed at locations 13, for example, between the first flat side 11 and heat exchanger 22. The joint may also possess a non-protruding flat second side 15, the first and second flat sides 11, 15 being parallel to each other and also having a first fluid passage 17 and a second fluid passage 19 passing through the first and second flat sides 11, 15, the first and second fluid passages 17, 19 being parallel to each other. A second block 12 may have a non-protruding flat third side 23 and a non-protruding flat fourth side 25, the third and fourth flat sides 23, being parallel to each other with a third fluid passage 27 and a fourth fluid passage 29 passing through the third and fourth flat sides 23, 25, the third and fourth fluid passages being parallel to each other.

A hollow first male insert 32 may reside within the first fluid passage 17 of the first block 10 and the third fluid passage 27 of the second block 12. The first male insert 32 may have a first groove 40 containing a first seal 36 around an outside diameter proximate a first end of the first male insert 32. The first seal 36 may reside within the first fluid passage 17. A second groove 42 may containing a second seal 38 around an outside diameter proximate a second end of the first male insert 32. The second seal 38 may reside within the second fluid passage 27. A central boss 56 may have an outside diameter larger than either the first seal 36 or the second seal 38. A first leading surface 44 and a second leading surface 46 may be farther from the central boss 56 than the first seal 36 or the second seal 38. A first trailing surface 48 and a second trailing surface 50 may be closer to the central boss 56 than the seal 36 of the first groove 40 or the seal 38 of the second groove 42. A first inclined surface 60 may lead from the first trailing surface 48 to an outside diameter of the central boss 56. A second inclined surface 62 may lead or blend from the second trailing surface 50 to an outside diameter of the central boss 56. A hollow second male insert 33 may reside within the second fluid passage 19 of the first block 10 and the fourth fluid passage 29 of the second block 12. The second male insert 33 may further employ a third groove 35 containing a third seal 37 around an outside diameter and proximate a third end 39. A fourth groove 41 containing a fourth seal 43 is positioned around an outside diameter and proximate a fourth end 45.

Continuing, a central boss 47 may be located midway between the third end 39 and the fourth end 45 of the second male insert 33. A third leading surface 49 and a fourth leading surface 51 may be farther from the central boss 45 than the third seal 37 or the fourth seal 43. A third trailing surface 53 and a fourth trailing surface 55 may be closer to the central boss 47 than the third seal 37 or the fourth seal 43 of the second male insert 33. A third inclined surface 57 may lead from the third trailing surface 53 to an outside diameter of the central boss 47 of the second male insert 33. A fourth inclined surface 59 may lead from the fourth trailing surface 55 to an outside diameter of the central boss 47 of the second male insert 33. The second side 15 of the first block 10 and the third side 23 of the second block 12 are held flat against each other by the first male insert 32 and the second male insert 33.

The first block 10 may employ a first chamfer 61 at an intersection of the first fluid passage 17 and the flat second side 15 and the second block 12 may employ a third chamfer 63 at an intersection of the third fluid passage 27 and the flat third side 23. The first inclined surface 60 of the first male insert 32 abuts against the first chamfer 61 and the second inclined surface 62 of the first male insert 32 abuts against the third chamfer 63.

The first block 10 may employ a second chamfer 65 at an intersection of the second fluid passage 19 and the flat second side 15, and the second block 12 may employ a fourth chamfer 67 at an intersection of the fourth fluid passage 29 and the flat third side 23. The third inclined surface 57 of the second male insert 33 abuts against the second chamfer 65 and the fourth inclined surface 59 of the second male insert 33 abuts against the fourth chamfer 67. A centerline 69 of the first fluid passage 17 of the first block 10 aligns with a centerline 69 of the third fluid passage 27 of the second block 12, and a centerline 71 of the second fluid passage 19 of the first block 10 aligns with a centerline 71 of the fourth fluid passage 29.

Turning in part to FIG. 6, the connection joint 21 may further employ a first male insert with a fifth groove containing a seal 112 and a sixth groove containing a seal 118 around an outside diameter of the first male insert. A second male insert may further employ a seventh groove containing a seventh seal and an eighth groove containing an eighth seal around an outside diameter of the second male insert. An advantage of a connection joint with additional seals is a joint that may contain a higher pressure liquid or gas and provide more durable or reliable sealing. The connection joint 21 may further employ a first threaded through hole 73 and a second threaded through hole 75 in the first block 10 while the second block 12 may further define a third threaded through hole 77 and a fourth threaded through hole 79. The first threaded through hole 73 and the third threaded through hole 77 may be aligned and the second threaded through hole 75 and the fourth threaded through hole 79 may be aligned when the joint 21 is assembled.

A connection joint 21 for a heat exchanger 22 may employ a first block 10 having a non-protruding flat first side 11 that is brazed to the heat exchanger 22 and a non-protruding flat second side 15, the first and second flat sides 11, 15 may be parallel to each other and also having a first fluid passage 17 and a second fluid passage 19 passing through the first and second flat sides 11, 15. The first and second fluid passages 17, 19 may be parallel to each other. A second block 12 may have a non-protruding flat third side 23 and a non-protruding flat fourth side 25. The third and fourth flat sides 23, 25 may be parallel to each other with a third fluid passage 27 and a fourth fluid passage 29 passing through the third and fourth flat sides 23, 25. The third and fourth fluid passages 27, 29 may be parallel to each other.

In yet another example of the teachings, and with reference to FIGS. 4 and 7, a hollow first male insert 80 may reside within the first fluid passage 17 of the first block 10 and the third fluid passage 27 of the second block 12. The first male insert 80 may employ a first seal 82 around an outside diameter proximate a first end 86. A second seal 84 may reside around an outside diameter and proximate a second end of the first male insert 32. The second seal 84 may also reside within the third fluid passage 27. A central boss 92 may have an outside diameter larger than either the first seal 82 or the second seal 84. A plurality of first support braces 104 may be located between the central boss 92 and the first seal 82, the central boss 92 and the first seal 82 may define a gap that is in width equal to a length of each of the plurality of first support braces 104. A first leading surface 88 and a second leading surface 90 may be farther from the central boss 92 than the first seal 82 or the second seal 84. A first trailing surface 81 and a second trailing surface 83 may be closer to the central boss 92 than the seal 82 or the seal 84. A first inclined surface 94 may lead from the first trailing surface 81 to an outside diameter of the central boss 92 and a second inclined surface 100 may lead from the second trailing surface 83 to an outside diameter of the central boss 92.

A second hollow male insert, which may be the same as that depicted in FIG. 4, may reside within the second fluid passage 19 of the first block 10 and the fourth fluid passage 29 of the second block 12, and serve a similar function as the first hollow male insert 80. The second male insert may further employ a third seal around an outside diameter and proximate a third end of the insert, a fourth seal around an outside diameter and proximate a fourth end, a central boss located midway between the third end and the fourth end of the second male insert, a plurality of support braces located between the central boss and the second seal such that the central boss and the second seal define a gap equal to a length of each of the plurality of second support braces.

Additionally, the second male insert may further employ a third leading surface and a fourth leading surface, the third and fourth leading surfaces being farther from the central boss than the third seal or the fourth seal, a third trailing surface and a fourth trailing surface, the third and fourth trailing surfaces being closer to the central boss than the third seal or the fourth seal of the second male insert, a third inclined surface leading from the third trailing surface to an outside diameter of the central boss of the second male insert, a fourth inclined surface leading from the fourth trailing surface to an outside diameter of the central boss of the second male insert. The second side of the first block and the third side of the second block are held flat against each other by the first male insert and the second male insert.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A connection joint in combination with a heat exchanger comprising:
    a first single piece block having a non-protruding flat first side that is brazed to the heat exchanger and a non-protruding flat second side, the first and second flat sides being parallel to each other and also having a first fluid passage and a second fluid passage passing through the first and second flat sides, the first and second fluid passages being parallel to each other;
    a second single piece block having a non-protruding flat third side and a non-protruding flat fourth side, the third and fourth flat sides being parallel to each other with a third fluid passage and a fourth fluid passage passing through the third and fourth flat sides, the third and fourth fluid passages being parallel to each other;
    a hollow first male insert residing within the first fluid passage of the first block and the third fluid passage of the second block, the first male insert further comprising:
        a first groove containing a first seal around an outside diameter proximate a first end, the first seal residing within the first fluid passage;
        a second groove containing a second seal around an outside diameter proximate a second end, the second seal residing within the third fluid passage;
        a central boss, the central boss having an outside diameter larger than either the first seal or the second seal;
        a first leading surface and a second leading surface, the first and second leading surfaces being farther from the central boss than the first seal or the second seal;
        a first trailing surface and a second trailing surface, the first and second trailing surfaces being closer to the central boss than the seal of the first groove or the seal of the second groove;
        a first inclined surface leading from the first trailing surface to an outside diameter of the central boss of the first male insert;
        a second inclined surface leading from the second trailing surface to the outside diameter of the central boss of the first male insert; and
    a hollow second male insert residing within the second fluid passage of the first block and the fourth fluid passage of the second block, the second male insert further comprising:
        a third groove containing a third seal around an outside diameter and proximate a third end;
        a fourth groove containing a fourth seal around an outside diameter and proximate a fourth end;
        a central boss located midway between the third end and the fourth end of the second male insert;
        a third leading surface and a fourth leading surface, the third and fourth leading surfaces being farther from the central boss than the third seal or the fourth seal;
        a third trailing surface and a fourth trailing surface, the third and fourth trailing surfaces being closer to the central boss than the third seal or the fourth seal of the second male insert;
        a third inclined surface leading from the third trailing surface to an outside diameter of the central boss of the second male insert; and
        a fourth inclined surface leading from the fourth trailing surface to the outside diameter of the central boss of the second male insert,
        wherein the second side of the first block and the third side of the second block are held flat against each other by the first male insert and the second male insert,
    a first chamfer is located on the first block at an intersection of the first fluid passage and the flat second side; and
    wherein the second single piece block further comprises:
    a third chamfer at an intersection of the third fluid passage and the flat third side, wherein the first inclined surface of the first male insert abuts against the first chamfer and the second inclined surface of the first male insert abuts against the third chamfer, wherein when the second side of the first block and the third side of the second block are held flat against each other, the first chamfer and the third chamfer are directly adjacent to each other and congruent to one another.

2. The combination of claim 1 wherein the first block further comprises:
    a second chamfer on the first block at an intersection of the second fluid passage and the flat second side, and
    wherein the second block further comprises:
    a fourth chamfer at an intersection of the fourth fluid passage and the flat third side, wherein the third inclined surface of the second male insert abuts against the second chamfer and the fourth inclined surface of the second male insert abuts against the fourth chamfer, wherein when the second side of the first block and the third side of the second block are held flat against each other, the second chamfer and the fourth chamfer are directly adjacent to each other and congruent to one another.

3. The combination of claim 1, wherein:
    a centerline of first fluid passage of the first block aligns with a centerline of the third fluid passage of the second block; and
    a centerline of the second fluid passage of the first block aligns with a centerline of the fourth fluid passage and the centerline of the third.

4. The combination of claim 3, the first male insert further comprising:
    a fifth groove containing a fifth seal and a sixth groove containing a sixth seal around an outside diameter of the first male insert, and
    the second male insert further comprising:
    a seventh groove containing a seventh seal and an eighth groove containing an eighth seal around an outside diameter of the second male insert.

5. The combination of claim 4, the first block further including a first threaded through hole and a second threaded through hole; and
    the second block further including a third threaded through hole and a fourth threaded through hole, wherein the first threaded through hole and the third threaded through hole are aligned, and the second threaded through hole and the fourth threaded through hole are aligned.

6. A connection joint in combination with a heat exchanger comprising:
- a first block having a non-protruding flat first side that is brazed to the heat exchanger and a non-protruding flat second side, the first and second flat sides being parallel to each other and also having a first fluid passage and a second fluid passage passing through the first and second flat sides, the first and second fluid passages being parallel to each other;
- a second block having a non-protruding flat third side and a non-protruding flat fourth side, the third and fourth flat sides being parallel to each other with a third fluid passage and a fourth fluid passage passing through the third and fourth flat sides, the third and fourth fluid passages being parallel to each other;
- a hollow first male insert residing within the first fluid passage of the first block and the third fluid passage of the second block, the first male insert further comprising:
  - a first seal around an outside diameter proximate a first end, the first seal residing within the first fluid passage;
  - a second seal around an outside diameter proximate a second end, the second seal residing within the third fluid passage;
  - a central boss, the central boss having an outside diameter larger than either the first seal or the second seal;
  - a first groove disposed between the first seal and the central boss and a second groove disposed between the second seal and the central boss;
  - a plurality of first support braces disposed within said first groove extending entirely between the first seal and the central boss and a plurality of second braces disposed within the second groove and extending entirely between the second seal and the central boss;
  - a first leading surface and a second leading surface, the first and second leading surfaces being farther from the central boss than the first seal or the second seal;
  - a first inclined surface disposed on a first side of an outside diameter of the central boss of the first male insert;
  - a second inclined surface disposed on a second side of the outside diameter of the central boss of the first male insert; and
- a hollow second male insert residing within the second fluid passage of the first block and the fourth fluid passage of the second block, the second male insert further comprising:
  - a third seal around an outside diameter and proximate a third end;
  - a fourth seal around an outside diameter and proximate a fourth end;
  - a central boss located midway between the third end and the fourth end of the second male insert;
  - a third groove disposed between the third seal and the central boss and a fourth groove disposed between the fourth seal and the central boss;
  - a plurality of third support braces disposed within the third groove and extending between the third seal and the central boss and a plurality of fourth braces disposed within the fourth groove and extending between the fourth seal and the central boss;
  - a third leading surface and a fourth leading surface, the third and fourth leading surfaces being farther from the central boss than the third seal or the fourth seal;
  - a third inclined surface disposed on a first side of an outside diameter of the central boss of the second male insert; and
  - a fourth inclined surface disposed on a second side of the outside diameter of the central boss of the second male insert,
- wherein the second side of the first block and the third side of the second block are held flat against each other by the first male insert and the second male insert; and
- wherein the first block includes a first chamfer at an intersection of the first fluid passage and the flat second side and the second block includes a second chamfer at an intersection of the third fluid passage and the flat third side, the first inclined surface of the first male insert abuts against the first chamfer and the second inclined surface of the first male insert abuts against the second chamfer when the second side of the first block and the third side of the second block are held flat against, each other, the first chamfer and the second chamfer are directly adjacent to each other and congruent to one another.

7. The combination of claim 6 wherein the first block further comprises:
- a third chamfer on the first block at an intersection of the second fluid passage and the flat second side, and
- wherein the second block further comprises:
- a fourth chamfer at an intersection of the fourth fluid passage and the flat third side, wherein the third inclined surface of the second male insert abuts against the third chamfer and the fourth inclined surface of the second male insert abuts against the fourth chamfer, wherein when the second side of the first block and the third side of the second block are held flat against each other, the second chamfer and the fourth chamfer are directly adjacent to each other and congruent to one another.

8. The combination of claim 6, wherein:
- a centerline of first fluid passage of the first block aligns with a centerline of the third fluid passage of the second block; and
- a centerline of the second fluid passage of the first block aligns with a centerline of the fourth fluid passage and the centerline of the third.

* * * * *